US012773754B2

(12) United States Patent
Milesi et al.

(10) Patent No.: US 12,773,754 B2
(45) Date of Patent: Oct. 27, 2026

(54) TURRET UNIT WITH B-AXIS AND MACHINE TOOL, IN PARTICULAR LATHE

(71) Applicants: GILDEMEISTER Italiana S.r.l., Brembate di Sopra (IT); DMG MORI CO., LTD., Yamatokoriyama (JP)

(72) Inventors: Luca Milesi, San Giovanni Bianco (IT); Stefano Corti, Calusco d'Adda (IT); Mirko Passerini, Gaggiano (IT); Tatsuhiko Kuriya, Nara (JP); Hironori Miura, Nara (JP); Kosuke Komorita, Nara (JP)

(73) Assignees: GILDEMEISTER ITALIANA S.R.L., Brembate di Sopra (IT); DMG MORI CO., LTD., Yamatokoriyama Nara (JP)

(*) Notice: Subject to any disclaimer, the term of this patent is extended or adjusted under 35 U.S.C. 154(b) by 1031 days.

(21) Appl. No.: 17/802,505

(22) PCT Filed: Feb. 9, 2021

(86) PCT No.: PCT/EP2021/053083
§ 371 (c)(1),
(2) Date: Aug. 25, 2022

(87) PCT Pub. No.: WO2021/170396
PCT Pub. Date: Sep. 2, 2021

(65) Prior Publication Data

US 2023/0148187 A1 May 11, 2023

(30) Foreign Application Priority Data

Feb. 28, 2020 (EP) .................................... 20160244

(51) Int. Cl.
*B23Q 39/00* (2006.01)

(52) U.S. Cl.
CPC .................................... *B23Q 39/00* (2013.01)

(58) Field of Classification Search
CPC ...................................................... B23Q 39/00
See application file for complete search history.

(56) References Cited

U.S. PATENT DOCUMENTS 6,669,416 B2 12/2003 Klement
8,561,273 B2 * 10/2013 Sahm .................... B23B 29/323
29/42

(Continued)

FOREIGN PATENT DOCUMENTS

CN 110340390 A * 10/2019 ............. B23B 29/32
DE 3609571 A * 9/1987

(Continued)

OTHER PUBLICATIONS

Japanese Office Action received in Application No. 2022-551770, dated Dec. 5, 2024, in 16 pages (with translation).

(Continued)

*Primary Examiner* — Vicky A Johnson
(74) *Attorney, Agent, or Firm* — PROCOPIO, CORY, HARGREAVES & SAVITCH LLP

(57) ABSTRACT

A turret unit for a lathe includes a turret main body M configured to be mounted to a carrier support of the machine tool, and a turret head H mounted to the turret main body M and including a turret disk H2. The turret disk is configured to be rotatable, by a first driving means D1, around a disk axis X which is an axis of rotation of the turret disk H2. The turret unit T includes a second driving means D2 for pivoting the turret head H around a turret axis Y, and the second driving means D2 is an inverted motor.

16 Claims, 6 Drawing Sheets

(56) References Cited

U.S. PATENT DOCUMENTS

| | | | |
|---|---|---|---|
| 2002/0114678 | A1 | 8/2002 | Klement |
| 2013/0032012 | A1 | 2/2013 | Baumann et al. |
| 2014/0029861 | A1 | 1/2014 | Masaki et al. |
| 2014/0245870 | A1 | 9/2014 | Walz et al. |
| 2014/0251097 | A1 | 9/2014 | Walz et al. |
| 2014/0318331 | A1 | 10/2014 | Walz et al. |
| 2020/0070252 | A1 | 3/2020 | Passerini et al. |

FOREIGN PATENT DOCUMENTS

| | | | |
|---|---|---|---|
| DE | 4235095 | C2 | 4/1997 |
| EP | 1228839 | A2 | 8/2002 |
| EP | 2548680 | A2 | 1/2013 |
| EP | 2714310 | B1 | 7/2016 |
| EP | 2714307 | B1 | 1/2017 |
| EP | 2714308 | B1 | 1/2017 |
| EP | 2714309 | B1 | 1/2017 |
| EP | 3616832 | A1 | 3/2020 |
| JP | 2005-177885 | A | 7/2005 |
| JP | 2012-161902 | A | 8/2012 |
| WO | 2008/029080 | A2 | 3/2008 |
| WO | 2012/163701 | A1 | 12/2012 |

OTHER PUBLICATIONS

EP Examination Report (Communciation pursuant to Article 94(3) EPC) received in EP 20160244.8, dated Feb. 22, 2024, 4 pages.

Office Action received in corresponding CN Application No. 202180010839.1, issued Feb. 19, 2025, in 11 pages, with translation.

Office Action received in CN 202180010839.1, dated May 31, 2024, in 21 pages (with translation).

Office Action in European Patent Application No. 20160244.8, dated Jun. 8, 2026.

* cited by examiner

TURRET UNIT WITH B-AXIS AND MACHINE TOOL, IN PARTICULAR LATHE

CROSS-REFERENCE TO RELATED APPLICATIONS

This application is US National Stage of International Patent Application PCT/EP2021/053083, filed Feb. 9, 2021, which claims benefit of priority from European Patent Application EP20160244.8 filed Feb. 28, 2020, the contents of both of which are incorporated herein by reference.

The present application relates to a compact turret unit for a machine tool, in particular lathe.

Conventional turret units as in DE 42 35 095 C2 have a tool turret having a turret body and a turret disk and tool holders for fixed and rotating tools, wherein a turret disk is supported by a hollow shaft. To drive the turret and the tools, gears are provided between the respective drive and the turret or the shaft. This requires a relatively large amount of space and increases the susceptibility to interference with each additional transmission component. Furthermore, resulting from the use of gearboxes inevitably asymmetries in the design that lead to the operation of the tool turret unit and the associated mechanical stresses to disadvantages due to the vibrations of the system and the uneven and thus less effective cooling.

In order to provide the tools for machining, tool carriers are supplied which are usually made available on movable tool carrier slides, in particular compound slides, which are arranged at the machine frame and can be moved by means of one or more linear axes relative to the work spindles (e.g. can be moved in three direction such as e.g. the X, Y or Z directions). Such machine tools of this type are known, for example, from EP 2 714 307 B1, EP 2 714 308 B1, EP 2 714 309 B1 or EP 2 714 310 B1.

For performing particular workpiece machining operations, it is frequently required that the overall turret be controllably revolved and, simultaneously, the machining tool must also perform a rotary movement.

It is an object of the present invention to provide an optimized turret unit which overcomes the problems of conventional turret structures. A further object is to provide a turret unit which requires reduced space and which at the same time has an increased rigidity and which allows to improve the machining accuracy of the machine tool. Moreover, it is an object to provide an optimized machine tool, in particular lathe.

To solve the problems the features of the independent claims are suggested. Preferred developments are in the dependent claims.

A turret unit according to an embodiment of the present application may comprise a turret main body configured to be mounted to a carrier support of the machine tool (and or a tool carrier support or assembly), and a turret head mounted to the turret main body and including a turret disk. The turret disk may be configured to be rotatable, by a first driving means, around a disk axis which is an axis of rotation of the turret disk. Said axis may preferably be the axis of symmetry of the preferably symmetric turret disk. The turret unit may include a second driving means for pivoting the turret head around a turret axis. The second driving means is a motor such as a direct drive motor, having a rotor arranged radially outside of the stator and the second driving means may be integrated in the turret main body. By providing this specific structure a compact and cost-effective assembly with increased rigidity can be achieved. Moreover by providing the turret unit according to the present invention, the unit can be placed at different carrier supports of the machine tool due to the symmetric design.

The second driving means may be integrated in the turret main body such that a cylindrical inner part (preferably most inner cylindrical part) of the turret main body forms the stator of the second driving means and/or a cylindrical outer part of the turret main body forms the rotor of the second driving means. Moreover the turret main body may have a cylindrical shape wherein the ratio of the length of the cylinder to the outer diameter thereof may preferably be in the range of 0.5 to 1.7 and more preferably about 1.2 for which significant vibration reduction can been achieved. Moreover, a compact and efficient turret unit can be provided.

The turret main body may include an inner cylinder part and an outer cylinder part wherein the outer cylinder part is provided to at least partially enclose the inner cylindrical part. The inner cylindrical part may include mounting surfaces for mounting the turret unit to the tool carrier assembly wherein on the inner surface of the outer cylinder part magnets of the rotor of the second driving means are attached.

The second driving means may be configured to directly (gearless) drive the turret head to pivot around the turret axis. Moreover the second driving means and a base of the turret head may provide a synchronized driving assembly. Accordingly a compact and efficient turret unit can be provided.

The turret head may be mounted directly to the rotor of the second driving means. Moreover, the turret main body may have a symmetric structure so that the turret unit can be used for left and right sides of the lathe or machine tool. In other words, the turret main body may be symmetric in view of the longitudinal axis thereof. A compact and efficient turret unit can be provided with increased rigidity.

The turret disk may be arranged such that the disk axis intersects with rotor magnets of the second driving means, preferably perpendicular. Accordingly a compact and efficient turret unit can be provided since the disk is arranged very close to the motor. The turret disk may comprise a controllably driven movable disk including a plurality of turret disk tool holder recesses, arranged in the circumferential direction of the disk, and so designed as to receive, for driving purposes, corresponding contoured end portions of the automatic machining tools. Moreover, the point of intersection of the disk axis with the turret axis may be within the axial range of the magnets of the rotor or inside the axial length of the rotor.

The turret unit may be an tool turret, and the form of such a tool turret may implement a disk turret which, to enable each tool to be moved into an operating position, can be turned in a controlled manner about a turret axis extending parallel to the workpiece spindle axis, at least in a lathe without a B-axis or in a lathe with a B-axis in the starting position of the tool turret.

The turret head can be rotated by at least 100 degrees, more preferably 110 degrees around the turret axis. Accordingly a compact and flexible turret unit can be provided.

The turret main body has a through hole located in the center and extending along the turret axis for allowing wires and hydraulic pipes to pass through. Accordingly a compact and efficient turret unit can be provided with increased rigidity.

The turret main body may have a flange part for attaching the turret unit to the carrier support of the machine tool and an inner shaft extending along the turret axis. Accordingly a compact and efficient turret unit can be provided.

The inner shaft may be attached to the flange part on one side and on the opposite side the inner shaft may be attached to the stator core of the stator. In a further development the flange part is integrated to the inner shaft (formed integrally).

The stator core of the second drive means may extend, in the axial direction, over half the inner shaft to thereby cover the center of the inner shaft. Accordingly, the length of the stator core may be more than 0.5 of the length of the inner shaft.

In an alternative embodiment the second drive means can be omitted and the structure of the turret main body includes instead, fixed shafts wherein on the outer circumferential surface of the shaft of the main body, the turret head is mounted.

The second driving means may be configured to directly pivot the turret head without a transmission in-between. Accordingly a direct drive can be implemented for the first and/or second and/or third driving means.

The turret head may be arranged on the circumference of the cylindrical outer part of the turret main body. For a particular compact structure and improved vibration characteristics the turret head mounting surface attached to the rotor may be arranged to coincide with the outer surface of the rotor of the second driving means.

The outer rotor surface may therefore be covered at least partially by the turret head. Preferably the disk axis and the turret axis may be arranged on separate, non-interfering planes.

The turret head may be arranged excentric to the turret main body and the turret disk may have a plurality of tool stations for carrying tools and at least one of said tool stations is equipable with a tool rotatively driven by a third driving means around a tool axis oriented preferably at a right angle to the axis of rotation of the turret disk. The axis of rotation of the third driving means may be coaxially to the center axis of a tool slot of the turret disk.

The third driving means may be arranged parallel and spaced apart and/or concentric to the disk axis and a coolant guide piston may be arranged to be parallel to the third driving means. Moreover, preferably a disk brake (extending in a radial direction) may be arranged between the rotor and stator of the second driving means. Accordingly, a disk brake may be provided between the outer cylinder part of the turret main body and the inner cylinder part of the turret main body.

The first driving means may be attached to a base of the turret head and the rotation axis of the first driving means may preferably be parallel and/or spaced apart from the disk axis. The hydraulic and/or electric lines of the third and first drive means may be connected in parallel to a main support part which extends through the through hole of the turret main body.

The turret main body may include an inner turret shaft which is the stator of the second driving means.

The first driving means may be arranged to extend away from the turret disk along the rotating axis of the first driving means and preferably orthogonal to the turret axis. Accordingly, improved movement space can be achieved with a compact structure.

The rotor of the second driving means may be supported via at least two bearings wherein at least one of the bearings includes a build-in encoder. Preferably, the bearing arranged closer to the mounting surface of the turret unit includes the build-in encoder.

Machine tool, in particular lathe, comprising a turret unit according to any of the preceding aspects.

The machine tool, in particular a lathe, may further comprise a machine frame having an upper tool carrier support portion, a lower tool carrier support portion and a spindle carrier portion arranged between the upper and lower tool carrier support portions, a spindle carrier, being arranged on or at a height of the spindle carrier portion of the machine frame, supporting a main spindle configured to receive a workpiece, the main spindle having a horizontally arranged spindle axis, one or more tool carriers, each tool carrier being supported on a tool carrier assembly being arranged on either the upper tool carrier support portion or the lower tool carrier support portion of the machine frame, wherein a lower side-surface of the lower tool carrier support portion, to which the one or more tool carriers are mountable, is arranged to have an overhanging inclination. Each carrier support portion and carrier portion is configured to preferably receive a turret unit.

Moreover, the lower side-surface of the lower tool carrier support portion may be inclined at an overhanging inclination angle in the range between 300 and 330 degrees, in particular at substantially 315 degrees.

The machine tool may be configured such that one or more or each tool carrier assembly is configured to independently move the respective tool carrier in one or more linear directions, including at least one of a Z-axis movement direction for moving the tool carrier horizontally in a direction in parallel to the spindle axis of the main spindle, an X-axis movement direction for moving the tool carrier radially with respect to the spindle axis of the main spindle, and a Y-axis movement direction for moving the tool carrier in a direction perpendicular to the spindle axis of the main spindle and perpendicular to the X-axis movement of the main spindle.

Method for machining workpieces using a machine tool with a turret unit of any preceding aspects comprising the step of pivoting the turret head around the turret main body axis to achieve a b-axis movement.

According to the aspects of the structure of the turret unit, a compact and cost-effective structure with increased rigidity can be achieved. Moreover by providing the turret unit according to the present invention, the unit can be placed at different carrier supports of the machine tool due to the symmetric design.

The disclosure of EP application with the application number EP 18191544.8 (EP 3616832) is herewith incorporated by reference.

Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

DETAILED DESCRIPTION OF THE DRAWINGS AND DESCRIPTION OF EXEMPLARY EMBODIMENTS

Figure 1:
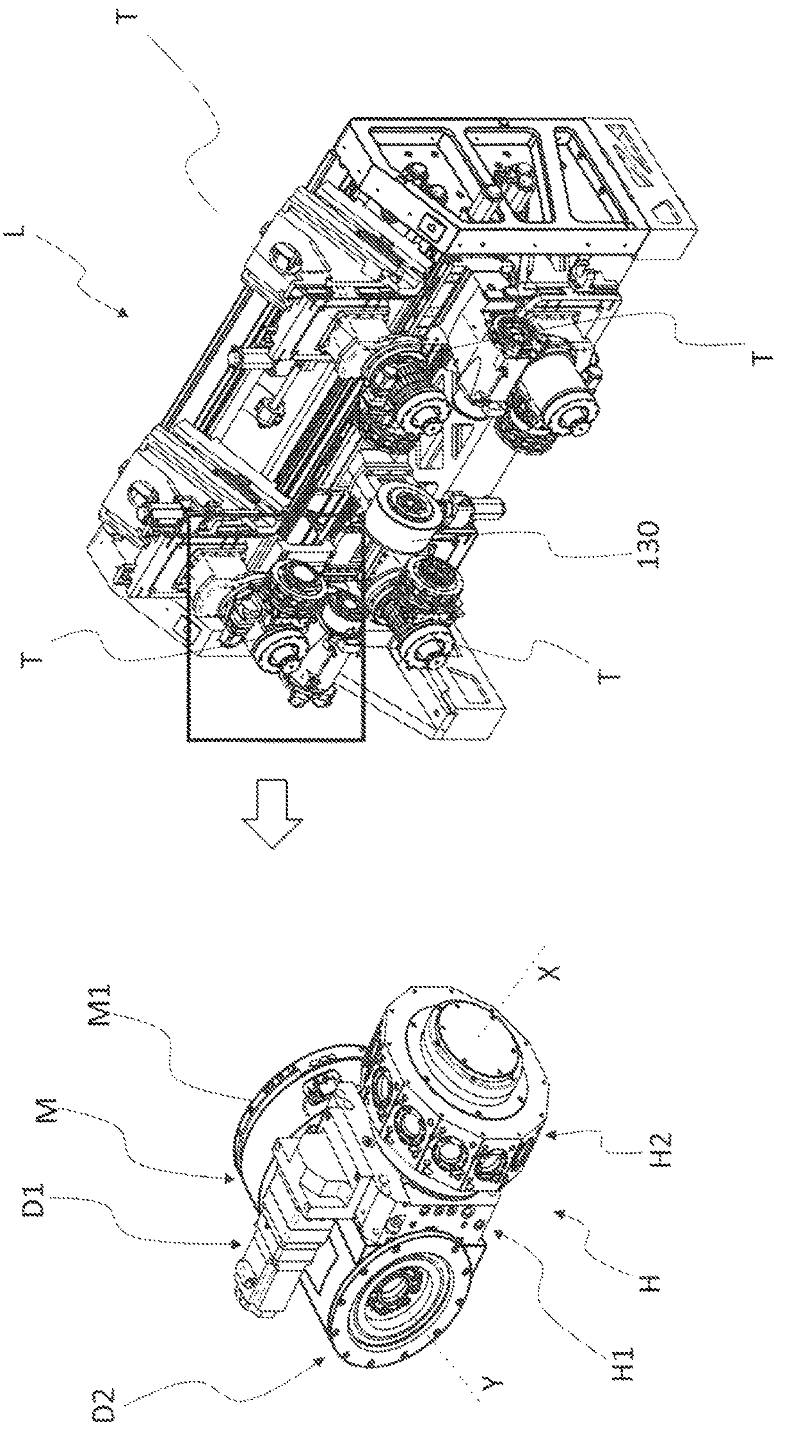
FIG. 1 exemplarily illustrates a schematic perspective view of a multi-spindle lathe having turret units and details of the turret unit.

In the following, preferred aspects and embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

FIG. 1 exemplarily shows a schematic perspective view of a lathe L according to an exemplary embodiment of the present invention. The lathe L is exemplarily realized as a turret lathe which comprises a machine frame for preferably supporting four tool carrier assemblies 150, a work piece carrying main spindle supported by a main spindle carrier and a work piece carrying counter spindle supported by a counter spindle carrier in order to provide more efficient work piece processing. The lathe L according to the present invention includes an auxiliary spindle carrier 130 arranged to be between the main spindle carrier and the counter spindle carrier.

Moreover, a turret unit T is mounted to the tool carrier assembly 150 and/or the main spindle carrier or counter spindle carrier.

In order to provide efficient and cost effective work piece machining, the present invention suggests a superior turret unit T which, on the one hand, requires a reduced mounting space on the machine tool and at the same time has a significantly improved vibration characteristic and mechanical stiffness. Other than for conventional systems an inverted motor concept is combined with a gearless design while at the same time omitting the torque transfer shaft, in one embodiment.

As shown in the left side of FIG. 1, the turret unit T has a compact design due to the inverted motor configuration and the gearless torque transmission. The turret unit T includes the turret main body M which can be attached via the attachment section M1 of the turret main body to the tool carrier assembly 150. The attachment section M1 is arranged at the rear side of the turret main body M and the opposing side thereof, which may be referred to as the front side of the main body M is a free end of the turret main body M. While conventional turret units include a separated turret main body from a driving means for controlling the pivot of the turret head H around the B axis or Y axis, the present invention suggests an integrated driving means which is referred to as the second driving means D2. Said second driving means B2 is integrally formed in the turret main body M as a structural part thereof. As such, the outer cylindrical part of the turret main body M and the inner cylindrical part of the turret main body are respectively designed as the actual rotor and stator of the second driving means D2. As shown in FIG. 1 in the left side, the outer cylindrical part of the turret main body M is rotatable around the Y axis. This movement is commonly referred to as B axis movement.

In the example shown in FIG. 1, the Y axis which is the rotation axis of the turret main body (or turret rotation axis) extends orthogonally to the spindle axis of the main spindle. In order to change the turret head position, the B axis movement is integrated into the lathe such that the turret head H and the turret disk H2 can be rotated around the Y axis such that different tools or work pieces which are attached to the turret disk H2 can be flexibly arranged in relation to the main or auxiliary spindle allowing flexible and efficient machining of work pieces. The lathe according to the present invention is also superior to conventional lathes since the tool carrier assembly allows movement in vertical and horizontal direction of the turret unit T, as clear from e.g. FIG. 2 wherein in combination with the turret unit T which allows a B axis movement very efficient processing of the work pieces can be achieved.

As clear from FIG. 1, the turret head H includes a base of the turret head H1 and a turret disk H2. The turret disk H2 has a rotation axis X. The turret disk H2 is configured to rotate around said turret disk rotating axis X. The revolving turret disk H2 has slots for machine tools and/or work pieces. Moreover, the turret disk H2 has an integrated third driving means D3 which allows to drive the tools attached or inserted into the slots of the turret disk H2. Preferably, the third driving means is a direct drive motor.

The arrangement of the turret disk H2 extends in a radial direction of the Y axis of the turret main body M. Accordingly, the turret disk H2 is arranged outside of the turret main body M in the radial direction. With regard to the axial direction of the Y axis of the turret main body M, the turret head H does not extend further than the free end of the turret main body M. The turret head H extends in the axial direction of the Y axis of the turret main body M, approximately to the end surface of the free end of the turret main body M. Accordingly, a very efficient and compact design can be achieved and the distance between the turret disk H2 and the attachment section M1 of the turret main body can be minimized. Inventors have realized such a specific design can significantly increase the mechanical stability and accuracy of the turret unit and the entire lathe L.

The turret head H has a flat turret design such that a base H1 of the turret head H is flat. Attached onto said base H1 the turret disk H2 is rotatably provided. The turret disk H2 is rotatable around the X axis. Preferably the X axis is approximately perpendicular to the Y axis of the turret main body M. For further flattening the turret head H, the additional driving means necessary for rotating the turret disk H2 is arranged as a first driving means D1 on top of the base H1 of the turret head and covering the part of the outer cylindrical shaft of the turret main body M. The first driving means D1 extends away from the turret disk H2 along the X axis. The base of the turret head H1 with the attached first driving means D1 form an L shape which is arranged to enclose the turret main body M to thereby achieve a vibration-resistant and compact turret unit T which can be flexibly attached to each of different tool carrier assembly positions of the lathe L or a machine tool. The radially outer circumferential surface of the turret main body M therefore is the mounting surface of the turret head H so that said turret head H can be attached radially spaced from the turret rotating axis Y.

Figure 2:
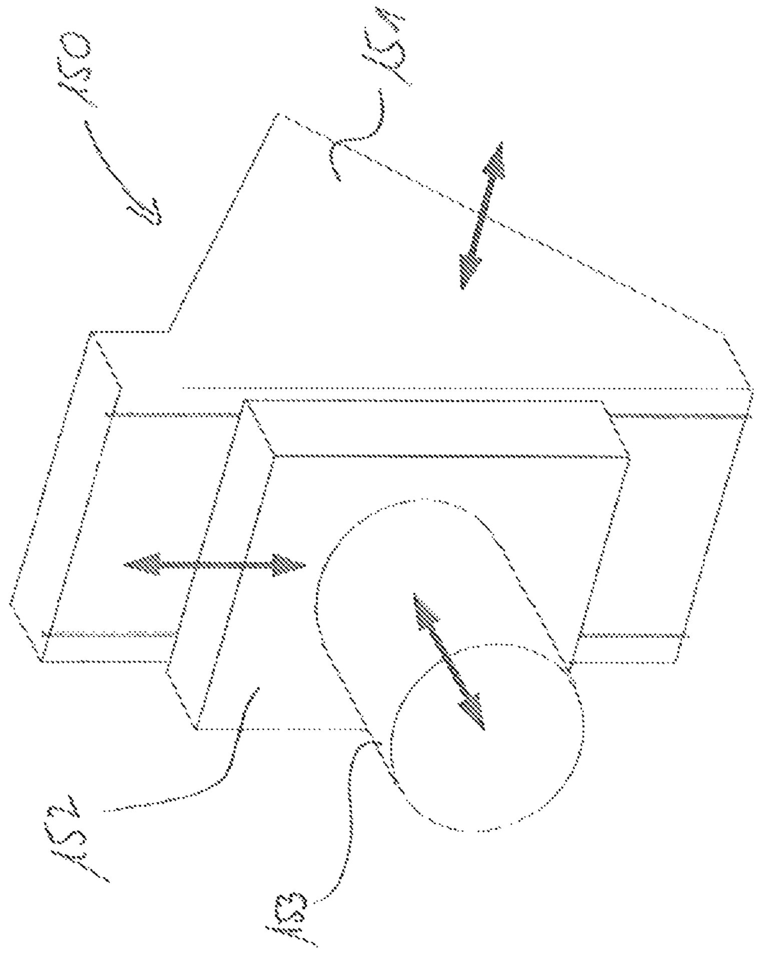
FIG. 2 exemplary illustrates a schematic perspective view of the tool carrier assembly.

In FIG. 2 a schematic perspective view of the tool carrier assembly 150 is shown. Exemplary all 1, 2, 3 or 4 tool carrier assemblies 150 raised on the machine frame of the machine tool may be realized similarly. Accordingly, due to the symmetric design of the tool carrier assembly as well as the turret unit T, flexible and interchangeable turret positioning can be achieved for the machine tool. More specifically, due to the specific design of the turret unit, said turret unit can be placed on each of the four positions of the tool carrier assembly of the lathe as shown in e.g. FIG. 1. Depending on the respective position on the lathe, the turret head H position can be rotated around the Y axis of the turret main body M. Accordingly, for equipping the lathe L with four turret units T, only a single type of turret unit T is necessary and four identical turret units T can be mounted on the respective mounting positions of the lathe L. Accordingly, with the turret unit T of the present application, a flexible and cost efficient machine tool and lathe can be provided.

The tool carrier assembly 150 in FIG. 2 includes a carrier support slide 151 which is configured to be slidably mounted to the guides of the upper and lower support portions of the machine frame of the lathe or machine tool. Accordingly, when mounted on top of the upper support portion on the guides, the carrier support slide 151 is configured to be moved horizontally on and along the guides in the Z axis in the horizontal direction in parallel to the horizontally and coaxially arranged spindle axis of the spindles. On the other hand, when mounted in a hanging state at the overhanging lower support position at the guides, the carrier support slide 151 is configured to be moved horizontally along the guides in the Z axis in the horizontal direction in parallel to the horizontally and coaxially arranged spindle axis of the spindles.

On the front side of the carrier support slide 151 of the tool carrier assembly 150 facing the machining area of the machine tool or lathe in between the spindles, a tool carrier support slide 152 is slidably mounted to the carrier support slide 151. The tool carrier support slide 152 is configured to be moved vertically on and along vertical guides arranged on a front face of the carrier support slide 151. Moreover, on the front side of the tool carrier support slide 152 of the tool carrier assembly 150, facing the machining area of the machine tool between the spindles, a horizontally arranged tool carrier quill or turret 153 extending from the front side of the tool carrier support slide 152 vertically into the machining area of the machine tool is exemplarily provided to mount a tool carrier. Accordingly, the turret 153 as shown in FIG. 2 may also be a turret unit T in accordance with e.g. FIG. 1 including the turret head H. Please note that in an alternative embodiment the turret main body M may also be fixed and therefore no rotation around the B axis may be possible for specific applications. Remaining features, however, are the same as in the embodiment shown in FIG. 1.

Figure 3:
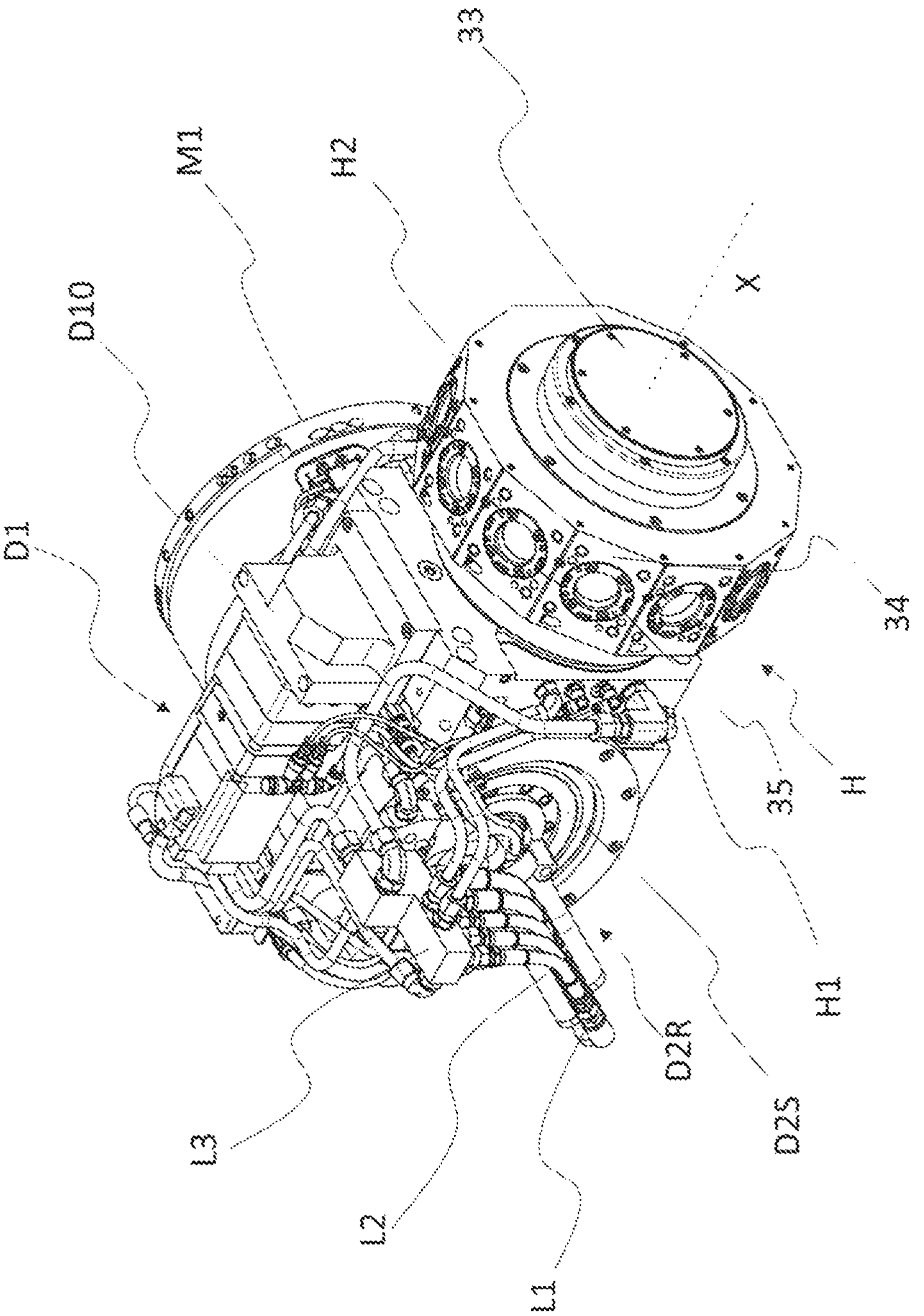
FIG. 3 exemplary illustrates a detailed view of the turret unit.

FIG. 3 shows a detailed view of the turret unit T and specifically the turret head H. Moreover, in FIG. 3 the piping and wiring for the hydraulic and electric systems of the turret unit T are indicated. To allow and efficient and optimized wiring and piping, the turret main body M includes a hollow shaft as the innermost cylindrical part. Accordingly, a through hole 24 exists which extends through the turret main body M in the axial direction along the Y axis to provide an opening for the piping and wiring in order to connect the turret head H with the hydraulic system and electric system in an improved manner.

As already shown in FIG. 1, the attachment section M1 of the turret main body M is arranged opposite to the free end side of the turret main body M. The turret main body M includes the integrated second driving means D2. Said driving means D2 includes the rotor D2R of the second driving means D2 which is arranged outside of the stator D2S of the second driving means. On the outermost surface on the circumference of the rotor of the second driving means D2R the base of the turret head H1 is attached to the turret main body M.

The central hydraulic L1 includes a plurality of hydraulic and/or electric coupling portions for connecting with hydraulic lines. More specifically, bending hydraulic lines L2 are connected to the respective connection sections of the central hydraulic lines L1. These bending sections are configured to be bent depending on the pivoting angle of the turret head H around the Y axis and therefore independent of the axis movement.

Preferably, the bending sections can be bent by 90 degrees and more preferably 120 degrees such that a safe hydraulic connection between the central hydraulic line L1 and the turret head H can be assured, even if the turret head H is pivoted around the Y axis. The bending movement of the bending sections of the hydraulic lines L2 is configured such that twisting of the pipes and wires along the longitudinal axis can be avoided. Accordingly, with a specific B axis movement of the turret unit also a very reliable, compact and comprehensive connection with the pipes and wires of the electric and hydraulic system can be achieved since bending in the longitudinal direction or the twisting around the longitudinal axis can be avoided and instead only bending around the lateral axis of the pipes is necessary, as also derivable from FIG. 3.

The central hydraulic line L1 is connected to the stator of the second driving means D2S which forms the innermost cylindrical hollow section of the turret main body M. Via the bending sections of the hydraulic and electric wires a connection of the central hydraulic lines L1 to the hydraulic attachment side on the rotor of the turret main body M and specifically the rotor of the second driving means D2R can be achieved. Accordingly, the outer hydraulic connecting section L3 is provided which is preferably fixed to the rotor of the second driving means D2R. Further, the hydraulic pipes are connected to the base of the turret head H1 and to hydraulic means attached to the rotor D2R. Also electric wires may preferably be included be connected, accordingly.

The turret head H has a flat design by having a plate-shaped base of the turret head H1 which is attached preferably directly to the rotor D2R of the turret main body M. The plate-shaped base of the turret head H1 may include guides for accurately positioning the turret head on the rotor D2R. For fixing the base of the turret head H1 to the rotor D2R preferably a plurality of bolts and screws are provided.

Moreover, the base of the turret head H1 provides a support for the turret disk H2. Accordingly, the turret disk H2 can be rotated in relation to the base of the turret head H1. The rotation of the turret disk H2 is preferably around the X axis of the turret disk H2. The turret disk H2 has a plurality of tool receiving slots 35 with disk surfaces 34. The tool receiving slots 35 extend in a radial direction of the turret disk H2 towards the X axis of the turret disk H2. Preferably, the turret disk H2 has at least 12 or 16 tool receiving slots 35 for receiving the respective tools. The hydraulic and electric connection of the turret disk H2 is preferably achieved via the base of the turret head H1. Accordingly, the base of the turret head H1 includes the connection portions of the pipes and wiring to the rotor connection part L3.

In order to achieve the rotary movement of the turret disk H2 around the X axis of the turret disk H2, the first driving means D1 is provided. Preferably, the first driving means D1 is attached via the gear D10 directly to the base of the turret head H1. The first driving means D1 extends away from the turret disk H2 over the turret main body M so that the base of the turret head H1 and the first driving means D1 have an L shape which encloses at least partially the outer circumference of the turret main body M to achieve a very compact and vibration resistant structure. In the axial direction of the turret disk H2, the cover 33 is provided which can be removed for maintenance.

Figure 4:
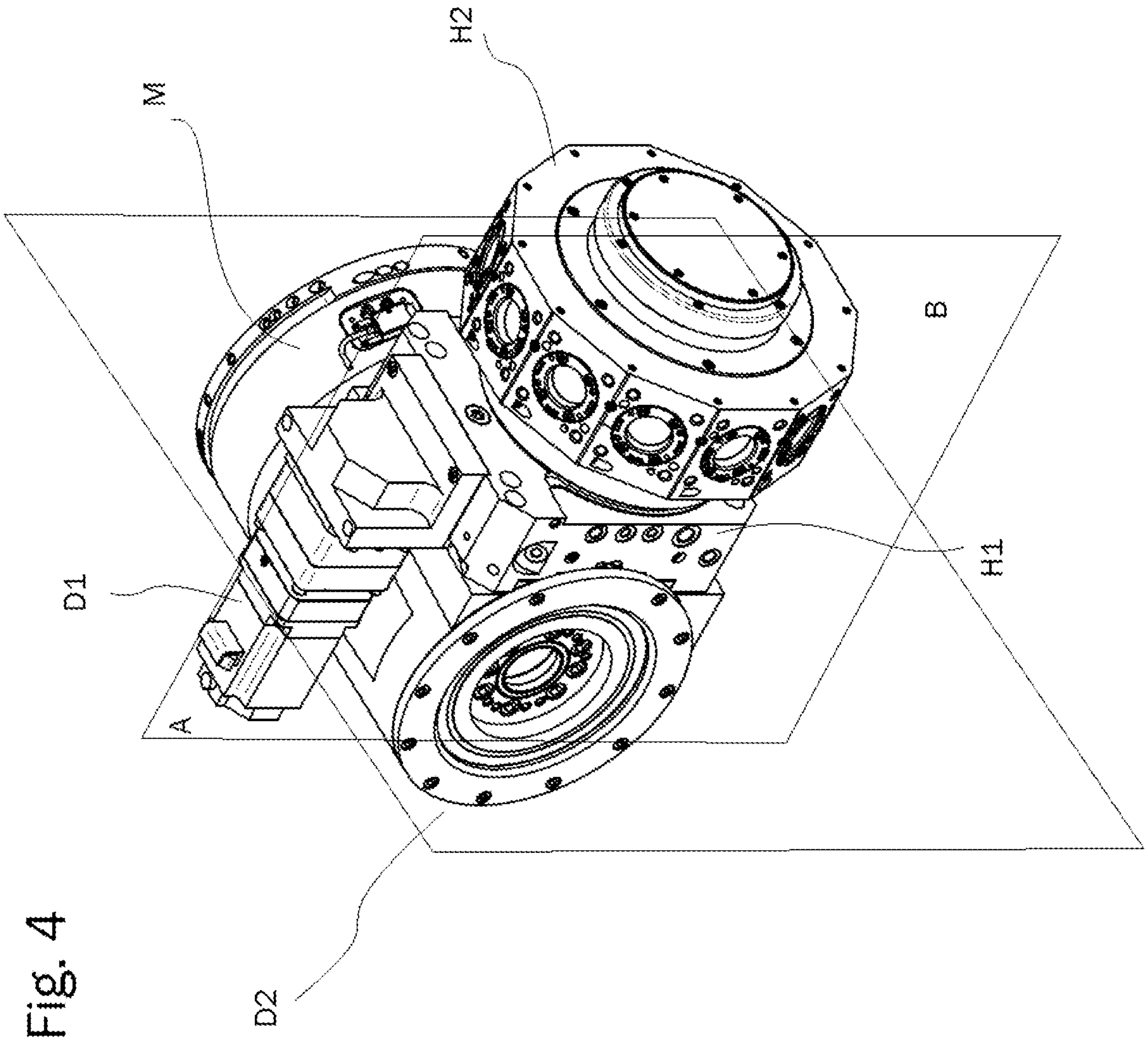
FIG. 4 exemplary illustrates a detailed overview of the turret unit.

FIG. 4 shows another sectional view of the turret unit T with the mounted turret head H. The plane A and B are indicative of the respective sectional views of the turret unit.

Figure 5:
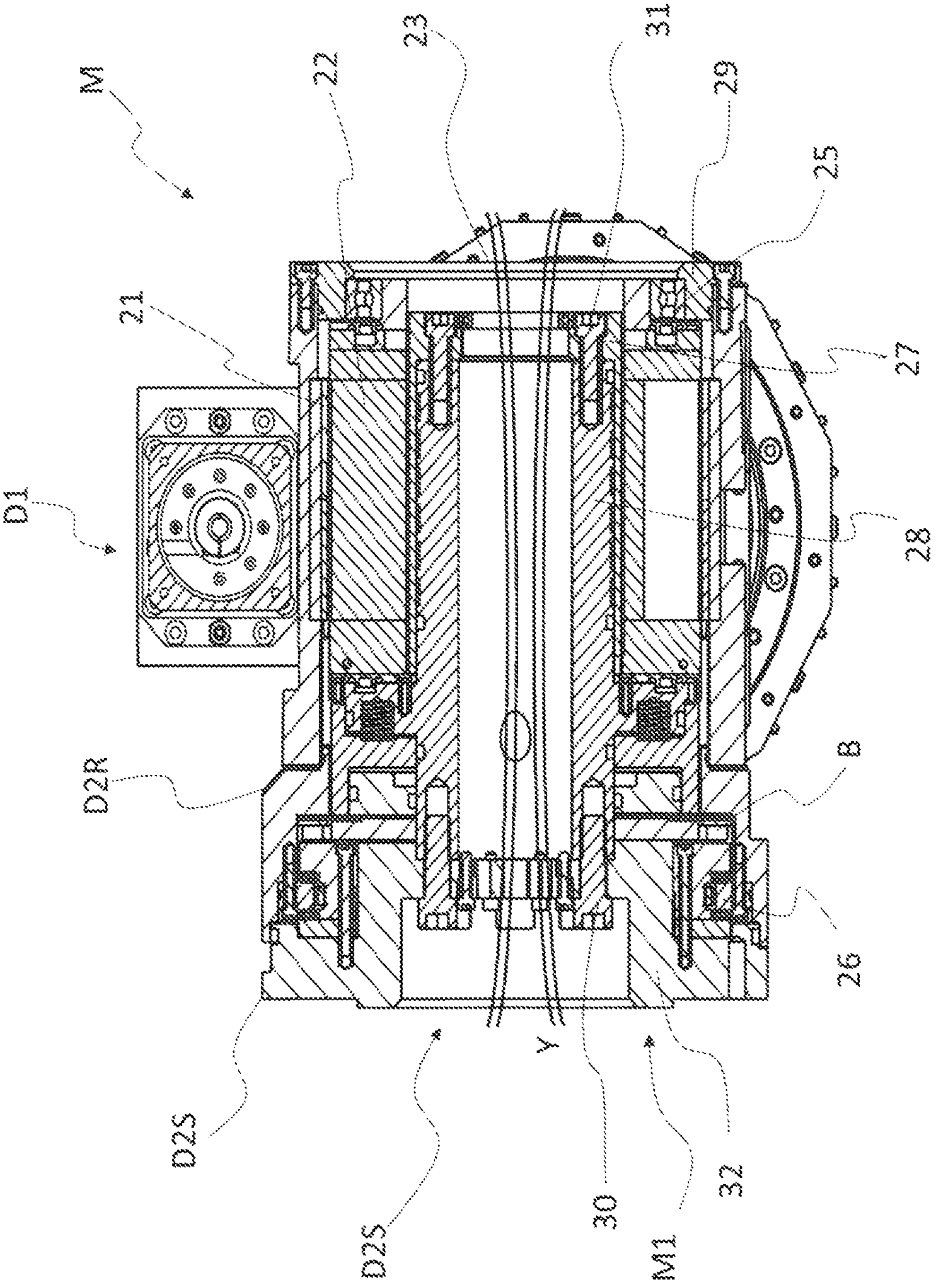
FIG. 5 exemplary illustrates a sectional view of the turret main body.

In FIG. 5 a sectional view corresponding to the plane extending along the axial direction of the turret main body M, as shown in FIG. 4, is displayed. On the left side of the turret main body M the attachment section M1 of the turret main body is indicated. Said attachment section M1 is provided for attaching the turret unit T to the tool carrier of the machine tool. Preferably, the left side or the attachment section M1 of the turret main body M is therefore fixed to the tool carrier of the machine tool or lathe. A compact design can be achieved by integrating the stator of the second driving means D2 with the fixed part of the turret main body M as shown in FIG. 5. Accordingly, the actual stator of the second driving means D2S may be regarded as the shaft assembly including the attachment section M1 with the flange part 32 to which the inner shaft 28 is fixedly connected. Onto said inner shaft 28 the stator core 22 can be fixedly attached. For achieving a specific efficient and compact design and increased machining accuracy, the disk break B is provided on the circumferential outer side of the stator D2S adjacent to the flange part 32 and the attachment section M1. The length of the disk break B may extend in the radial direction of the stator core 22.

The support of the rotor D2R of the second driving means D2 is achieved by providing the front bearing 25 and the bearing 26 (preferably a roller bearing). In a development, the roller bearing 26 includes the built in encoder for allowing highly accurate control while at the same time achieving compact design by using the integrated encoder. Accordingly, the turret unit T can be designed even more compact.

The front bearing 25 of the turret main body M for supporting the rotor D2R of the second driving means D2 is preferably arranged at the free end of the turret main body M. Opposite to said side, the roller bearing 26 is provided adjacent to the flange part 32. Between said bearings, the rotor D2R provides an attachment section onto which the turret head H is mounted. Preferably, the attachment section does not extend in the axial direction along the Y axis of the turret main body beyond the front bearing 25 or the roller bearing 26. In other words, preferably the fixing and attachment parts of the attachment section for fixing the turret head H onto the rotor D2R are provided between the front bearing 25 and the roller bearing 26. More preferably, the attachment sections including the attachment holes and guides for attaching the turret head H onto the rotor D2R are provided radially above the stator core 22 and the magnets 21 of the rotor D2R such that the distance between the attachment section and the base of the turret head H1 and the magnets 21 of the rotor D2R can be minimized. As shown in FIG. 5, the first driving means D1 is provided directly above the magnets 21 of the rotor D2R and directly above the stator core 22 so that preferably the first driving means D1 does not extend in the axial direction along the Y axis, beyond the axial length of the magnets 21 and/or the axial length of the stator core 22.

The second driving means D2 is configured to be a gearless drive for allowing gearless driving (direct drive) of the turret head H to pivot around the turret axis Y. More specifically, an inverted motor is provided, integrated into the structure of the turret main body M. Said inverted motor has a stator which at the same time is also used as the inner shaft of the turret main body M. The outer shaft of the turret main body M is configured as the rotor D2R of the second driving mean D2. Due to this design, mainly providing the rotor with the magnets 21 of the rotor on the outside and the stator core 22 on the inside in a radial direction the size of the magnets 21 of the rotor can be significantly reduced. Accordingly, the diameter of the turret main body M in the radial direction thereof can be significantly reduced so that the mechanical load can be reduced.

The specific design as described with the inverted motor concept implemented as a structure of the turret main body M synergistically lead to the effect of a compact turret unit design with increased accuracy resulting from reduced mechanical stress. In other words, the compact design with inverted motor concept and the reduced thickness of the magnets 21 can reduce the distances and mechanical forces and therefore the resulting moment applied to the turret unit during movement and during the working process as well as the forces applied during static use cases.

In order to further reduce the size of the turret unit T and, at the same time, assure efficient connection of the hydraulic and/or electric means of the turret unit T a main body through hole 24 is provided which extends preferably through the entire turret main body M. Accordingly, wiring and pipes and hydraulic lines 23 can extend along the Y axis of the turret main body M. In order to connect the inner shaft 28 with the flange part 32, fixing means 30 and 31 are provided which are, for example, bolts or screws for tightly attaching the related parts. Accordingly, the stator core 22 can also be safely attached to the inner shaft 28.

The rotor D2R of the second driving means D2 includes the magnets 21 which are arranged on the circumferential inner side of the rotor D2R. Preferably, the rotor D2R also includes an outer shaft which has the mounting surface for attaching the base of the base H1 of the turret head H. Accordingly, the turret head H can be attached directly to the rotor D2R of the second driving means D2. For achieving an improved support of the rotor D2R the front bearing 25 is attached to the rotor D2R via the rotor fixing cover 29 attached at the free end of the turret main body M. For further reducing the mechanical stress, the front bearing 25 is arranged in a radial direction inside of the magnets 21 of the rotor D2R. At the same time, the roller bearing 26 is arranged radially more distant from the X axis than the front bearing 25. Accordingly, the roller bearing 26 which is closer to the attachment section M1 has a larger diameter than the front bearing 25.

One aspect of the present application is that the turret head H is attached closely to the second driving means D2. For example, the rotating axis of the turret disk H2 which is referred to as the X axis in e.g. FIG. 1 is arranged such as to intersect with the magnets 21 of the rotor so that as a result the turret head H is arranged in close proximity to the driving means D2 which may also be a direct drive motor. More preferably, the rotating axis of the turret disk H2 has an intersection preferably perpendicularly, with the outer circumferential side of the magnets 21 of the rotor. Accordingly, in order to transmit the torque of the second driving means D2 for rotating or pivoting the turret head H no extra transmissions shaft is necessary since the turret head is fixed directly on the outer surface of the rotor D2R. Accordingly, the axial distance between the center of the second driving means D2 and the rotating axis X of the turret disk H2 is reduced to a minimum and can preferably be held close to 0. Accordingly, in one preferable application the rotating axis X of the turret disk H2 is placed congruent to the axial center of the second driving means D2 and specifically the center of the stator core 22 and/or the center of the rotor D2R in the axial direction with regard to the Y axis of the turret main body M.

In other words, with regard to the attachment section M1 of the turret main body M, the turret unit T of the present application allows that the second driving means D2 is arranged on the same side of the turret main body M as the turret head H (in view of the flange) so that a transmission shaft for transmitting the torque from a distant driving means to the actual turret head can be avoided. At the same time, the pipes and wiring 23 are provided at the Y axis which is the rotating axis of the turret main body M allowing the B axis movement. Moreover, it may also be clear that with regard to the section shown in FIG. 5 the design of the turret main body M can be regarded as symmetrical which allows a flexible use of the turret unit for the machine tool and different positions on the machine tool respectively. Accordingly, the turret main body M is configured to be symmetrical with regard to a plane extending along the rotating axis of the turret body and specifically the rotating axis Y. In other words, the turret unit T uses a symmetric turret main body M.

Figure 6:
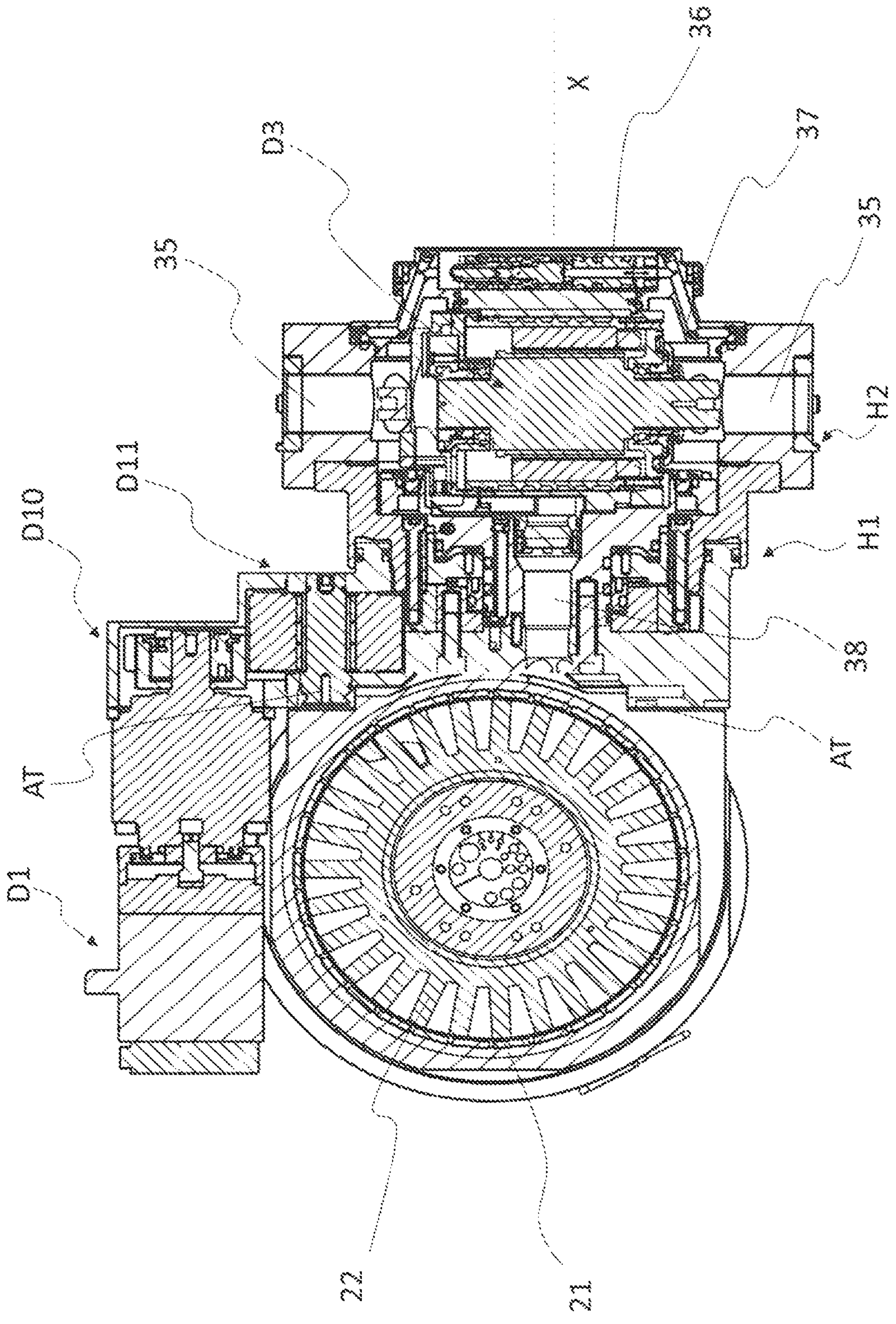
FIG. 6 exemplary illustrates a sectional view of the turret head and different pivoting positions thereof.

FIG. 6 shows a view along the Y axis with sectional view of the turret head H. The turret disk H2 is provided with several tool receiving slots 35 regularly arranged around the outer circumference of the turret disk H2. The respective slots extend in the radial direction of the turret disk H2. A coolant guide piston 36 is provided parallel to a driving means arranged in the center of the turret disk H2. More specifically, the third driving means D3 is a motor provided at the inside of the turret disk H2. Parallel to said third driving means D3, the coolant guide pistons 36 is provided in close proximity to the tool receiving slots 35. Due to the close arrangement of the coolant guide piston 36 the distance for the coolant to be provided to the tool receiving slots 35 and respectively to the tools applied into the tool receiving slots can be reduced significantly. Accordingly, the compact design of the turret unit can be further improved and be made even more compact while at the same time assuring coolant to be provided the respective tools. In other words, the coolant guide piston 36 is provided spaced apart in the direction along the X axis and parallel to the symmetry axis of the turret disk H2. The driving axis of the third driving means D3 can be provided parallel to the center line of the tool receiving slots 35 and the respective tools to be inserted into the tool receiving slots.

The first driving means D1 is applied to extend over the outer circumferential surface of the turret main body M. The first driving means D1 is connected via the outer gear part D10 and the inner gear part D11 with the base H1 of the turret head H. The base H1 of the turret head H combined with the first driving means D1 form an L shape which at least partially encloses the outer circumferential surface of the turret main body M (preferably in a vertical and horizontal direction). Moreover, as shown in FIG. 6, the entire turret head (H) having the x-axis as a center axis may be pivoted, as clear from the two positions for the x-axis shown in the figure.

As can be seen in FIG. 6, the stator core 22 of the stator body D2S and the magnets 21 of the rotor D2R are arranged in a radial direction very closely to the attachment surfaces and attachment means of the turret head H and specifically the base of the turret head H1. The center of the turret head is arranged outside of the rotating axis of the turret main body M and more specifically the turret head H and the center of the turret disk H2 are arranged radially spaced apart from the rotating axis of the turret main body and the stator core 22 of the second driving means D2.

The turret head H1 has a base through hole 38 provided for the wiring. Accordingly, by providing this additional through hole 38, it is possible to include wiring through the base of the turret head for attaching hydraulic and/or electric lines of the turret head.

By exemplary embodiments as described above, there are proposed beneficial aspects and features to enhance the machining options of the turret unit and machine tool, specifically lathe, to provide a compact machine concept, allowing for more flexible, accurate, efficient and reliable machining operations, and/or to improve accuracy and/or stability of the machine tool.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above sections, are possible.

Those skilled in the art will appreciate that various adaptations, modifications, and/or combination of the just described embodiments can be configured without departing from the scope of disclosure of the present invention. Those skilled in the art will also appreciate, in view of this disclosure, that different embodiments of the invention described herein may be combined to form other embodiments of the invention. Therefore, it is to be understood that, the invention may be practiced other than as specifically described herein.

The invention claimed is:

1. A turret unit for a machine tool, the turret unit comprising:

a turret main body configured to be mounted to a carrier support of the machine tool; and a turret head mounted to the turret main body and including a turret disk, wherein the turret disk is configured to be rotatable, by a first driving means, around a disk axis which is an axis of rotation of the turret disk, the turret unit includes a second driving means for pivoting the turret head around a turret axis, the second driving means is a motor having a rotor arranged radially outside of a stator wherein the second driving means is integrated in the turret main body, and wherein the turret main body includes an inner turret shaft which is the stator of the second driving means.

2. The turret unit according to claim 1, wherein the second driving means is integrated in the turret main body such that a cylindrical inner part of the turret main body forms the stator of the second driving means and a cylindrical outer part of the turret main body forms the rotor of the second driving means.

3. The turret unit according to claim 1, wherein the second driving means is configured to directly drive the turret head for pivoting the turret head around the turret axis.

4. The turret unit according to claim 1, wherein the turret head is mounted directly to the rotor of the second driving means.

5. The turret unit according to claim 1, wherein the turret disk is arranged such that the disk axis intersects with rotor magnets of the second driving means.

6. The turret unit according to claim 1, wherein the turret head can be pivoted by at least 110 degrees around the turret axis.

7. The turret unit according to claim 1, wherein the turret main body has a through hole located in a center and extending along the turret axis for allowing wires and/or pipes to pass through.

8. The turret unit according to claim 1, wherein the turret main body has, as a part of a cylindrical inner part, a flange part for attaching the turret unit to the carrier support of the machine tool and an inner shaft extending along the turret axis.

9. The turret unit according to claim 1, wherein the inner shaft is attached to a flange part on one side and on an opposite side the inner shaft is attached to a stator core of the stator.

10. The turret unit according to claim 1, wherein the turret head is arranged on a circumference of the cylindrical outer part of the turret main body.

11. The turret unit according to claim 1, wherein the turret head is arranged excentric to an axis of symmetry of the turret main body and the turret disk has a plurality of tool stations for carrying tools and at least one of said tool stations is equipable with a tool rotatively driven by a third driving means around a tool axis oriented preferably at a right angle to the axis of rotation of the turret disk.

12. The turret unit according to claim 1, wherein a third driving means is enclosed in the turret disk and arranged parallel and/or spaced apart to the disk axis and a coolant guide piston is arranged to be parallel to the third driving means.

13. The turret unit according to claim 1, wherein the disk axis and the turret axis are arranged on separate, non-interfering planes.

14. The turret unit according to claim 1, wherein the first driving means is attached to a base of the turret head and the rotation axis of the first driving means is parallel and/or spaced apart from the disk axis.

15. The turret unit according to claim 1, wherein the first driving means is arranged to extend away from the turret disk along the rotating axis of the first driving means and orthogonal to the turret axis.

16. The turret unit according to claim 1, wherein the rotor of the second driving means is supported via at least two bearings, and wherein at least one of the bearings includes a build-in encoder.

* * * * *